Figure 1:
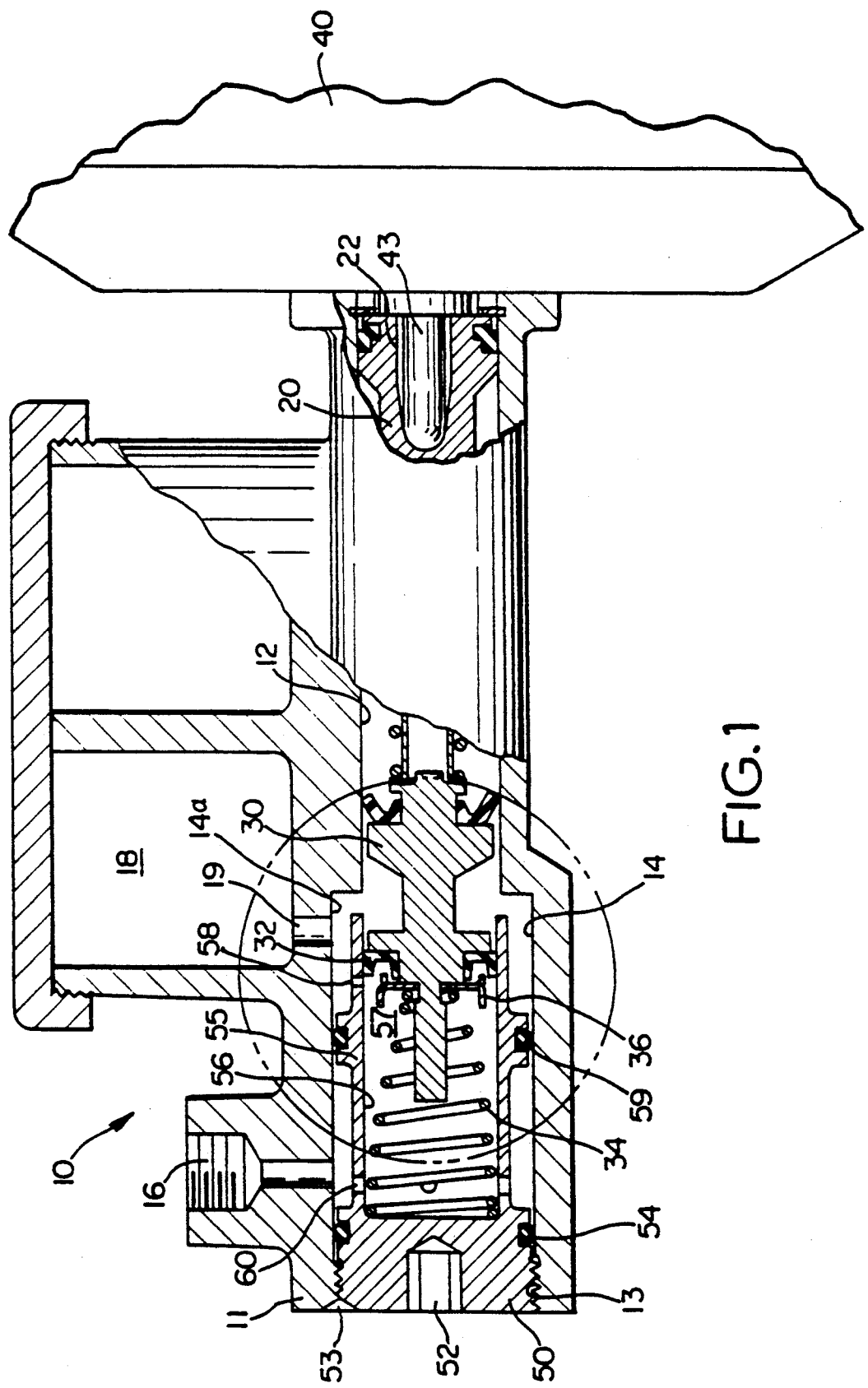

United States Patent [19]

Kosarski, Jr.

[11] Patent Number: 5,207,061
[45] Date of Patent: May 4, 1993

[54] MASTER CYLINDER WITH EXTERNALLY ADJUSTED SECONDARY COMPENSATION

[75] Inventor: Raymond Kosarski, Jr., Niles, Mich.

[73] Assignee: Allied Signal Inc., Morristown, N.J.

[21] Appl. No.: 842,824

[22] Filed: Feb. 27, 1992

[51] Int. Cl.$^5$ .................... B60T 13/00; B60T 11/26
[52] U.S. Cl. .................... 60/547.1; 60/562; 60/588; 92/13.3
[58] Field of Search .......... 60/547.1, 572, 584, 60/585, 588, 562; 92/13, 13.3

[56] References Cited

U.S. PATENT DOCUMENTS

| | | | |
|---|---|---|---|
| 2,213,946 | 9/1940 | Bowen | 60/588 X |
| 2,322,009 | 6/1943 | Fowler | 60/588 X |
| 3,059,435 | 10/1962 | Rusconi | 60/588 X |
| 3,321,913 | 5/1967 | Harrah | 60/584 X |
| 3,412,557 | 11/1968 | Williams | |
| 3,499,287 | 3/1970 | Schrader | 60/592 X |
| 3,830,549 | 8/1974 | Kito et al. | |
| 4,078,386 | 3/1978 | Ewald | |
| 4,132,073 | 1/1979 | Ewald | |
| 4,265,491 | 5/1981 | Shutt | |
| 4,348,866 | 9/1982 | Hayashida | 60/588 X |
| 5,042,254 | 8/1991 | Schonlau et al. | 60/562 |
| 5,154,107 | 10/1992 | Morin et al. | 92/13.3 |

FOREIGN PATENT DOCUMENTS

| | | | |
|---|---|---|---|
| 114585 | 2/1942 | Australia | 60/585 |
| 376767 | 7/1990 | European Pat. Off. | |
| 1139640 | 7/1957 | France | |
| 507989 | 1/1939 | United Kingdom | 60/588 |
| 860739 | 2/1961 | United Kingdom | |
| 914333 | 1/1963 | United Kingdom | 60/585 |

*Primary Examiner*—Edward K. Look
*Assistant Examiner*—John Ryznic
*Attorney, Agent, or Firm*—Larry J. Palguta; Ken C. Decker

[57] ABSTRACT

The master cylinder (10) with externally adjusted secondary compensation comprises a tandem master cylinder (10) having primary and secondary piston assemblies (20, 30) disposed within a stepped bore (12). The portion of the bore containing the secondary piston assembly (30) has an enlarged diameter bore section (14) such that an end member (50) may be threadedly received within a bore opening (13) of the master cylinder (10). The end member (50) includes a longitudinal portion (55) having therein at least one outlet opening (60) and one compensation opening (58), each opening (58, 60) communicating with an interior opening (56) receiving slidably the secondary piston assembly (30) and a resilient spring (34) seated at one end of the interior opening (56) and biasing the secondary piston assembly (30). In order to adjust the position of the compensation opening (58) relative to a preferred position of the secondary piston assembly (30), the primary piston assembly (20) is held by a rod member (21) at a maximum at-rest position corresponding to a maximum at-rest booster output rod (43) position, while pressurized medium is transmitted to a secondary chamber outlet port (16) and flows to the reservoir (18). The end member (50) is threadedly advanced until the compensation opening (58) is closed off by a seal (32) of the secondary piston assembly (30) and pressurized medium flow blocked, and then rotated to retract the end member (50) a predetermined distance equal to the diameter of the compensation opening (58) so that flow is re-established. Finally, the threaded end member (50) is fixed relative to the master cylinder (10) by mechanical swaging (56) or other appropriate attachment methods.

10 Claims, 2 Drawing Sheets

MASTER CYLINDER WITH EXTERNALLY ADJUSTED SECONDARY COMPENSATION

The present invention relates generally to a master cylinder, and in particular to a tandem master cylinder having an externally adjusted secondary compensation.

Many automotive vehicles utilize a master cylinder in conjunction with a vacuum brake booster as part of the braking system. It is important that the pistons of the master cylinder be positioned appropriately relative to an at-rest, maximum setting of the booster output rod in order to minimize fluid compensation losses, brake Pedal travel, and to effect a preferred brake pedal "feel". Existing master cylinders typically have a fluid compensation loss which is determined by combining several component dimensions. It is highly desirable to provide a master cylinder and a method which will permit the fluid compensation loss to be set accurately during a final test of the master cylinder, and thus minimize the fluid compensation loss, minimize the corresponding brake pedal travel, and effect a preferred brake pedal "feel".

The present invention provides solutions to the above problems by providing a master cylinder with externally adjusted secondary compensation, comprising a body having a stepped bore therein, a primary piston and a secondary piston of primary and secondary pressure chambers, an end of said bore closed by an end member received fixedly at said end, the end member having a longitudinal portion extending longitudinally into said stepped bore, the longitudinal portion having an interior opening receiving slidably said secondary piston, the secondary piston having seal means disposed thereabout and engaging a surface of the interior opening, resilient means located between said secondary piston and a bottom of said interior opening, at least one compensation opening disposed in said longitudinal portion and adjacent said seal means, and at least one outlet opening in said end member, the end member positioned laterally in said bore prior to the end member being fixed to the body so that said compensation opening is located closely adjacent a portion of said seal means in order to minimize compensation fluid loss and associated brake pedal travel.

Figure 2:
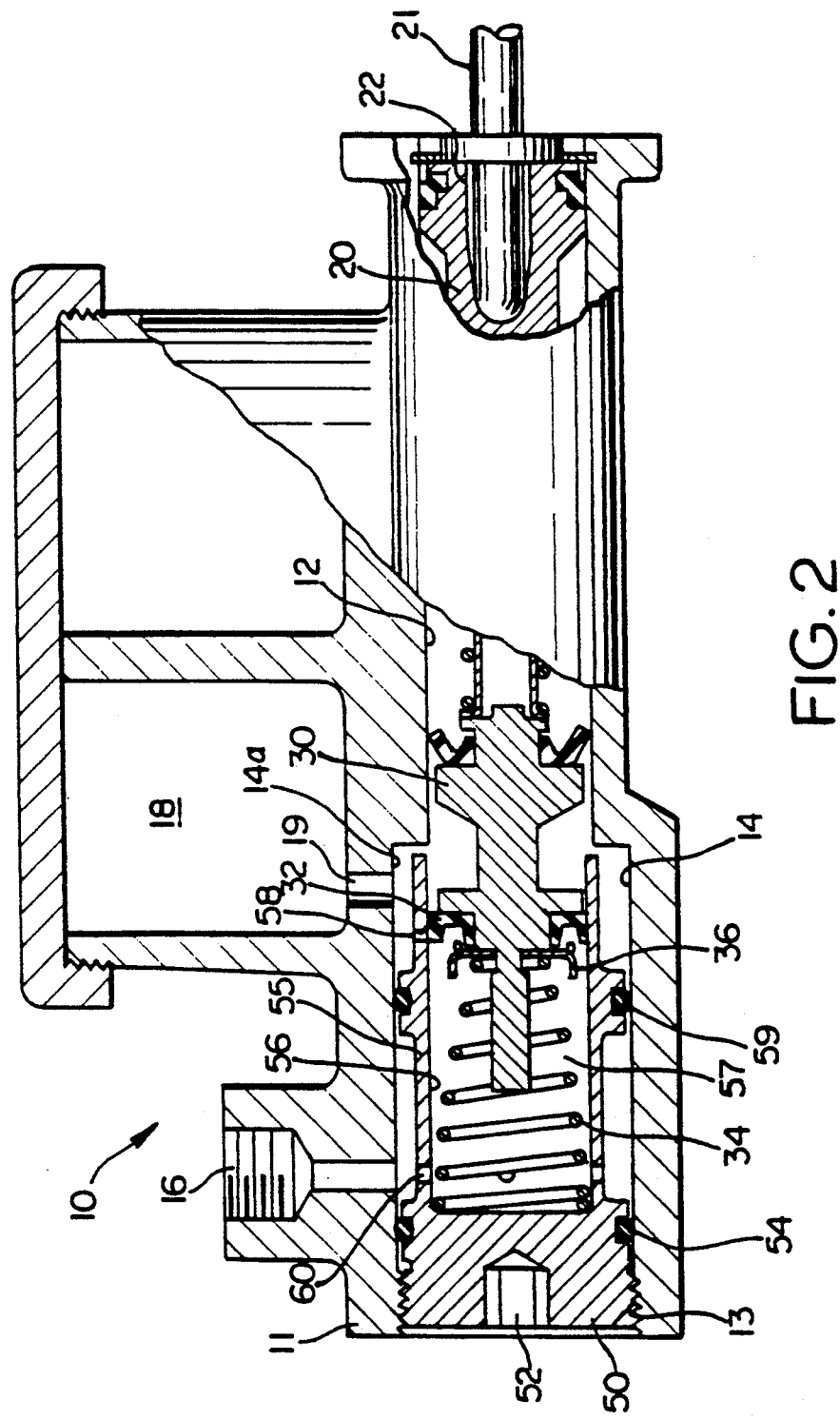

One way of carrying out the invention is described in detail below with reference to the drawings which illustrate an embodiment in which:

FIG. 1 is a section view of a master cylinder and an associated schematically illustrated vacuum brake booster in accordance with the present invention; and FIG. 2 is an illustration of the master cylinder coupled with a test fixture and the circled portion of FIG. 1 illustrating the end member threadedly advanced so that the compensation holes are blocked by the secondary piston seal.

The master cylinder of the present invention is designated generally by reference numeral 10 in FIG. 1. Master cylinder 10 includes stepped bore 12 and conventional primary piston assembly 20 and conventional secondary piston assembly 30. Primary piston assembly 20 includes rear recess 22 receiving output rod 43 of vacuum brake booster 40. Primary piston assembly 20 engages secondary piston assembly 30 which includes annular secondary lip seal 32, secondary spring or resilient means 34, and spring seat member 36. Stepped bore 12 includes enlarged diameter bore section 14 which communicates with outlet port 16. Reservoir 18 includes secondary pressure chamber compensation hole 19 while another portion of reservoir 18 includes a primary pressure chamber compensation hole (not shown). End 11 of master cylinder 10 includes bore opening 13 which comprises threads that receive threadedly end member 50. The threads of end member 50 engage the threads of opening 13 to allow end member 50 to be advanced laterally relative to master cylinder 10. End member 50 includes tool opening recess 52, a pair of spaced apart seals 54 and 59, and longitudinal portion 55. Longitudinal portion 55 defines interior opening 56 which receives slidably secondary piston assembly 30 and seats fixedly resilient means 34 of the assembly. Longitudinal portion 55 includes a plurality of secondary compensation openings 58 and a plurality of secondary outlet openings 60. Longitudinal portion 55 defines along with secondary piston assembly 30 a secondary pressure chamber 57.

In order to externally adjust the secondary compensation loss of the master cylinder, the master cylinder is attached to a pressurized medium source during final tests. The pressurized medium, typically pressurized air, is connected with the master cylinder via outlet opening 16 and reservoir 18. The master cylinder is held in a fixed position so that a rod member 21, (see FIG. 2) representing the output rod of a vacuum brake booster, engages recess 22 of the primary piston and locates the primary and secondary piston assemblies in their corresponding maximum at-rest position when the master cylinder is coupled to the vacuum brake booster. The pressurized medium is then applied to outlet port 16 so that it flows into enlarged diameter bore section 14, through outlet openings 60, through secondary pressure chamber 57 and out of compensation openings 58 to bore compensation portion 14a and to hole 19 and reservoir 18. A tool (not shown) is then inserted into correspondingly shaped recess 52 in order to rotate end member 50 and cause it to threadedly advance laterally into enlarged diameter bore section 14. End member 50 is advanced until compensation holes 58 move past and are blocked by seal 32, and pressurized medium flow between outlet port 16 and reservoir 18 ceases. Then the tool is rotated in a reverse direction to cause end member 50 to threadedly retreat a predetermined distance which corresponds to the diameter of the compensation holes 58. This results in the compensation holes being moved to a position adjacent the leading edge of lip seal 32 so that the flow of pressurized medium is re-established between outlet port 16 and reservoir 18. Finally, the threaded end member is fixed to the master cylinder by mechanical swage 53 or by any other appropriate attachment mechanism or composition. Thus, compensation holes 58 are positioned via the external adjustment of end member 50 so that they are adjacent the leading edge of secondary lip seal 32 to minimize fluid compensation losses during operation of the master cylinder, minimize the travel distance of the associated brake pedal which operates the vacuum booster, and also to provide a preferred brake pedal "feel" effected by minimal compensation loss and brake pedal travel.

I claim:

1. A master cylinder with externally adjusted secondary compensation, comprising a body having a stepped bore therein, a primary piston and a secondary piston of primary and secondary pressure chambers, an end of said bore closed by an end member received fixedly at said end, the end member having a longitudinal portion extending longitudinally into said stepped bore, the longitudinal Portion having an interior opening receiving slidably said secondary piston, the secondary piston having seal means disposed thereabout and engaging a surface of the interior opening, resilient means located between said secondary piston and a bottom of said interior opening, at least one compensation opening disposed in said longitudinal portion and adjacent said seal means, and at least one outlet opening in said end member, the end member positioned laterally in said bore prior to the end member being fixed to the body so that said compensation opening is located closely adjacent a portion of said seal means in order to minimize compensation fluid loss and associated brake pedal travel.

2. The master cylinder in accordance with claim 1, wherein the longitudinal portion includes a seal thereabout which engages a surface of the stepped bore in order to separate sealingly an outlet portion of the bore from a compensation portion of the bore.

3. The master cylinder in accordance with claim 2, wherein the compensation portion of the bore includes a compensation hole communicating with a reservoir of the master cylinder.

4. The master cylinder in accordance with claim 3, wherein the end member includes a second seal thereabout which engages the bore adjacent the end of the body.

5. The master cylinder in accordance with Claim 4, wherein said end member includes an end recess for receiving a tool which effects rotation of the end member and a corresponding lateral displacement.

6. The master cylinder in accordance with claim 5, further comprising a plurality of outlet openings and a plurality of compensation openings in the longitudinal portion .

7. The master cylinder in accordance with claim 6, wherein a portion of said end member is deformed into engagement with said body in order to fixedly position said end member.

8. The master cylinder in accordance with claim 1, further comprising a vacuum operated brake booster connected with said master cylinder and having an output plunger for displacing the primary and secondary pistons.

9. A method for externally adjusting the secondary compensation of a master cylinder, comprising the steps of:
   (a) disposing a primary and a secondary piston within a stepped bore of a master cylinder, the secondary piston including sealing means thereabout and resilient means connected therewith,
   (b) inserting an end member into an open end of a body of said master cylinder, the end member having a longitudinal portion with a seal member thereabout engaging the bore, at least one compensation opening and one outlet opening in the longitudinal portion and an interior opening therein receiving said second piston and resilient means,
   (c) connecting a member with said primary piston in order to position said primary piston and said secondary piston to preferred locations within the bore,
   (d) transmitting a medium to an outlet port of said master cylinder so that said medium flows to the bore and through said outlet opening of the longitudinal portion, interior opening, compensation opening, back into the bore and through a communication hole with said reservoir,
   (e) advancing said end member in the bore until said compensation opening is closed by said sealing means,
   (f) retracting said end member by a predetermined amount equal to the diameter of the compensation opening such that communication between the interior opening and the reservoir via the compensation opening and communication hole is re-established, and
   (g) positioning fixedly the end member relative to the body of the master cylinder.

10. The method in accordance with claim 9, wherein said longitudinal portion includes a plurality of outlet openings and a plurality of compensation openings.

* * * * *